March 26, 1957

F. P. SHARPE 2,786,374

RIVET INSERTING MACHINE

Filed April 24, 1950

INVENTOR.
FREDERICK P. SHARPE

BY
ATTORNEYS

March 26, 1957 F. P. SHARPE 2,786,374
RIVET INSERTING MACHINE
Filed April 24, 1950 7 Sheets-Sheet 3

INVENTOR.
FREDERICK P. SHARPE
BY
ATTORNEYS

March 26, 1957   F. P. SHARPE   2,786,374
RIVET INSERTING MACHINE
Filed April 24, 1950   7 Sheets-Sheet 5

*INVENTOR.*
FREDERICK P. SHARPE
BY
ATTORNEYS

March 26, 1957     F. P. SHARPE     2,786,374
RIVET INSERTING MACHINE
Filed April 24, 1950     7 Sheets-Sheet 6

INVENTOR.
FREDERICK P. SHARPE

ATTORNEYS

March 26, 1957  F. P. SHARPE  2,786,374
RIVET INSERTING MACHINE
Filed April 24, 1950  7 Sheets-Sheet 7

FIG.7.

INVENTOR.
FREDERICK P. SHARPE
BY
ATTORNEYS

United States Patent Office

2,786,374
Patented Mar. 26, 1957

2,786,374

RIVET INSERTING MACHINE

Frederick P. Sharpe, Dearborn, Mich., assignor to Kelsey-Hayes Company, a corporation of Delaware Application April 24, 1950, Serial No. 157,793

13 Claims. (Cl. 78—46)

The invention relates to rivet inserting machines and refers more particularly to machines for inserting single headed rivets into angularly spaced holes in an assembled rim and wheel body.

The invention has for some of its objects to provide an improved rivet inserting machine which is efficient in operation; to provide a machine for inserting an annular series of angularly spaced rivets at the same time; to provide a machine having but one rivet hopper; and to provide a machine which is dependent for its operation upon the work for receiving a rivet.

The invention has for other objects to provide an improved hopper and plunger device for feeding rivets to the chutes; to provide an improved device for successively feeding individual rivets to a device for inserting the rivets; and to provide an improved rivet inserting device.

With these and other objects in view the invention further resides in the novel features of construction and combinations and arrangements of parts as more fully hereinafter set forth:

Figure 1:
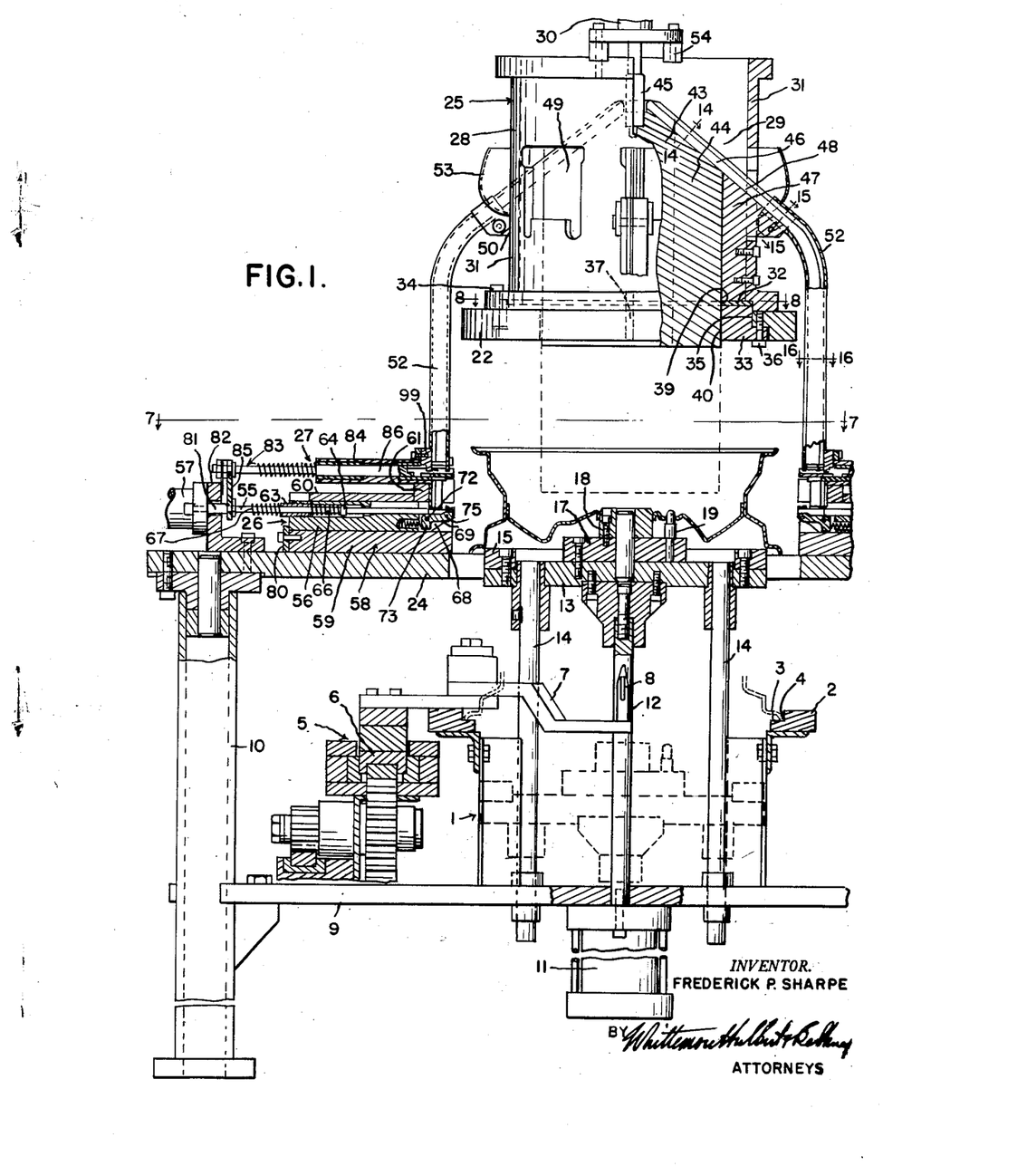
Figure 1 is a sectional view partly in elevation of a rivet inserting machine embodying the invention.
Figures 2, 9:
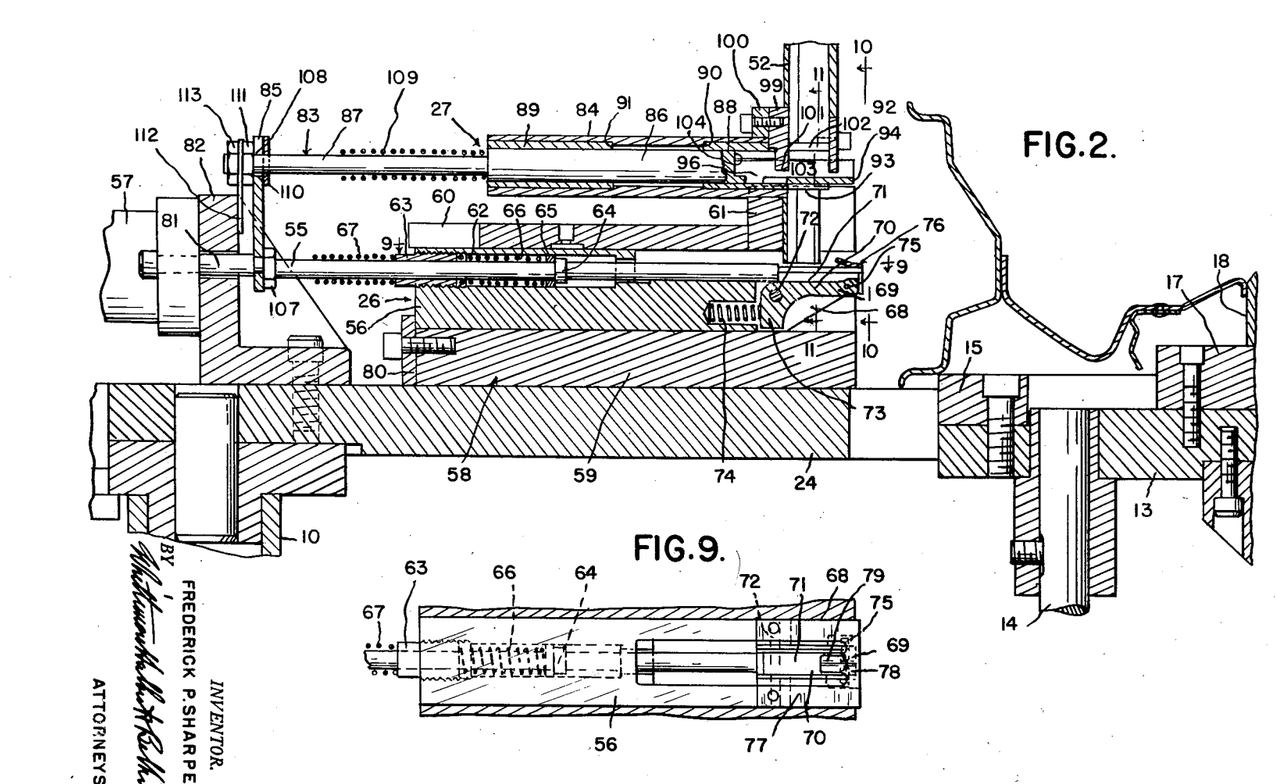
Figures 2 and 3 are enlarged views of a portion of Figure 1 as showing the parts in different position.
Figures 9, 10 and 11 are cross sections on the lines 9—9, 10—10 and 11—11 respectively of Figure 2.
Figure 3:
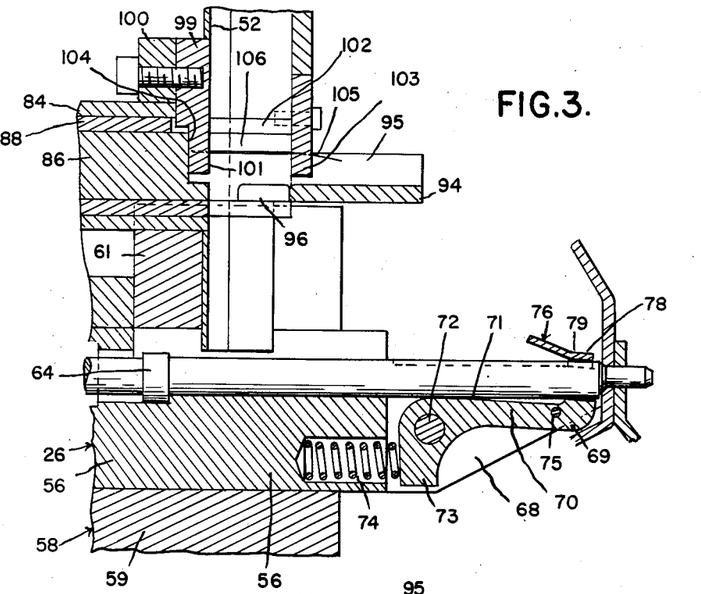
Figure 4:
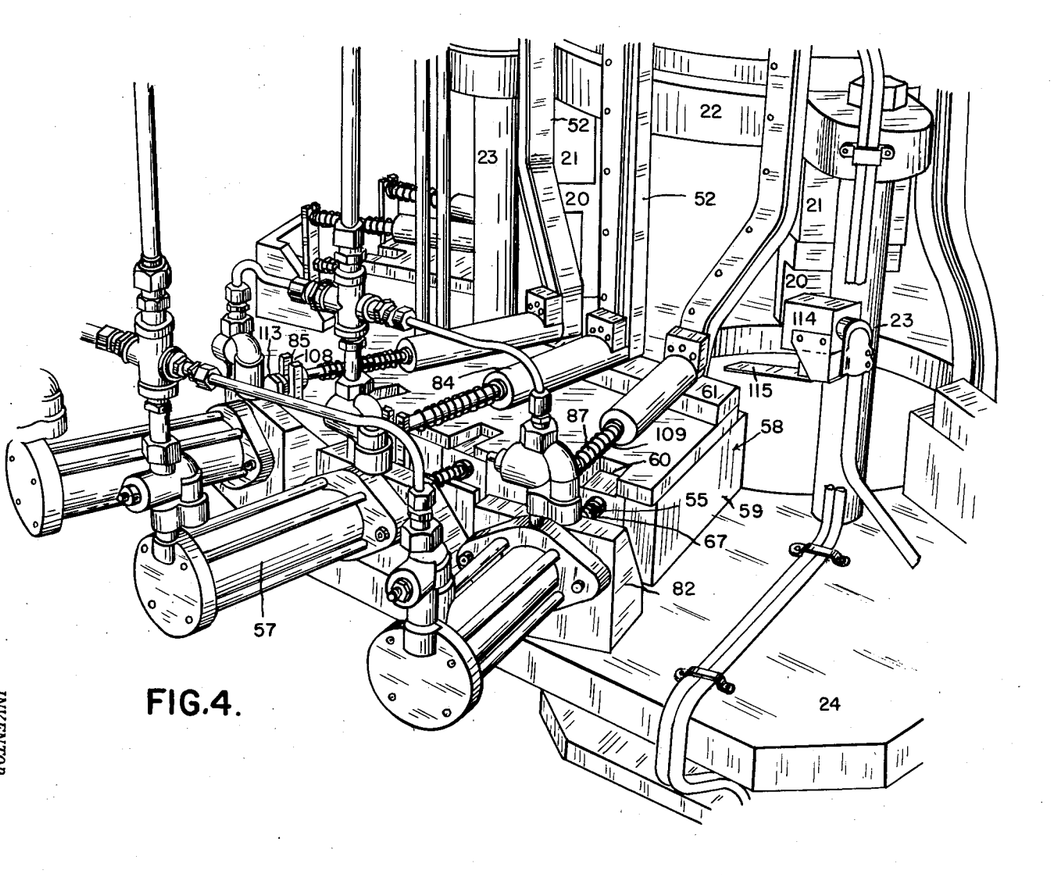
Figure 4 is a photographic view of a portion of the machine.
Figures 5, 10, 11:
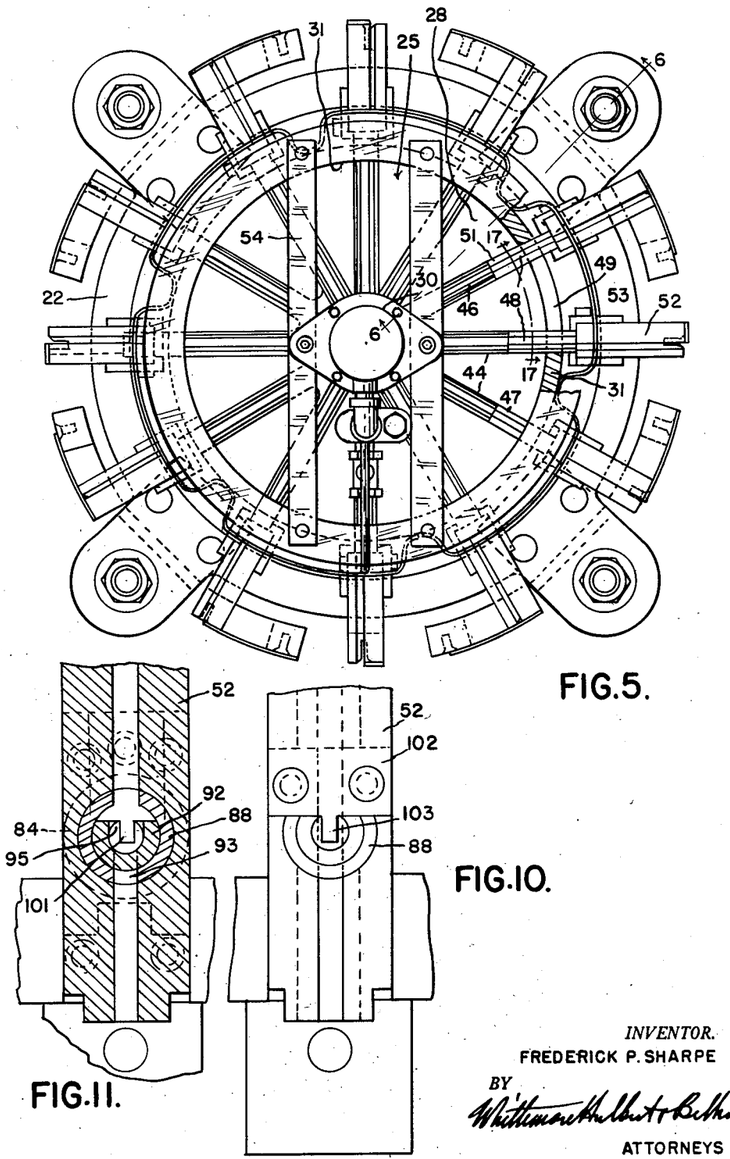
Figure 5 is a top plan view with parts broken away of the machine.
Figures 6, 8, 14, 15, 16, 17:
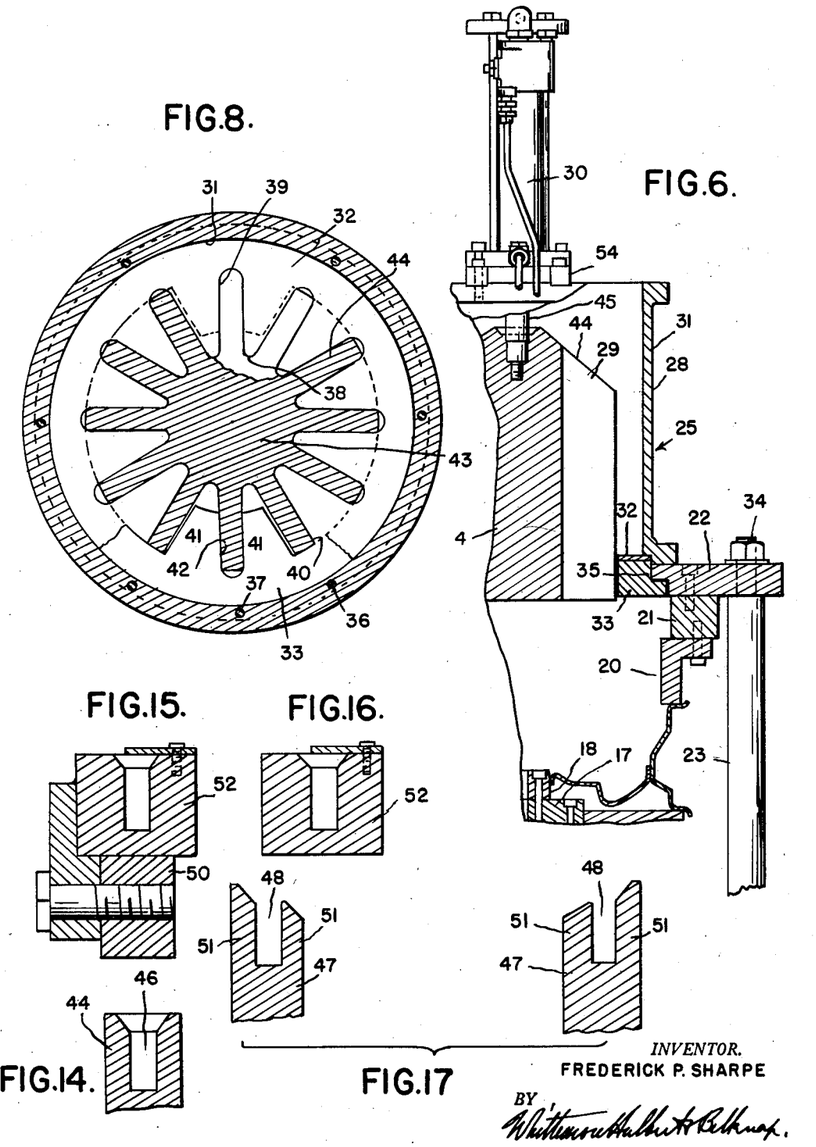
Figure 6 is a cross section on the lines 6—6 of Figure 5.
Figure 8 is a cross section with parts broken away on the line 8—8 of Figure 1.
Figures 14, 15 and 16 are cross sections on the lines 14—14, 15—15, and 16—16 respectively of Figure 1.
Figure 17 is a cross section on the line 17—17 of Figure 5.
Figure 7:
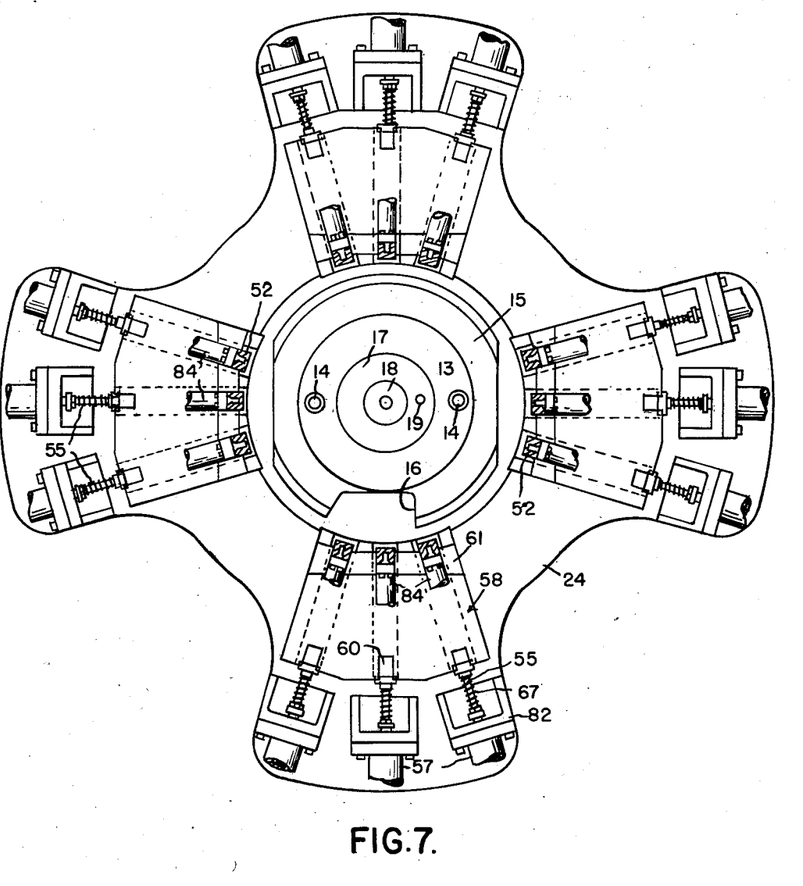
Figure 7 is a cross section on the line 7—7 of Figure 1.
Figure 12:
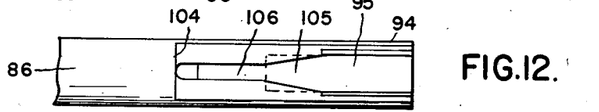
Figures 12 and 13 are respectively top and bottom plan views of the separating rod.
Figure 13:
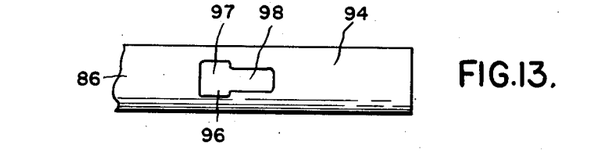

The machine illustrated in the present instance is designed to insert single headed rivets into angularly spaced holes in an assembled tire carrying rim and wheel body. As illustrated the rim is a drop center rim and the wheel body is a spider having a central bolting-on portion, a web and radiating spokes, the web and spokes being peripherally flanged. The assembled rim and spider are in predetermined axial relation with the base of the well of the rim overlying the peripheral flanged portions at the radially outer ends of the spokes and both the base and peripheral flanged portions being formed with axially aligned holes.

The machine has the frame 1 carrying the pair of horizontal parallel guides 2 for the assembled rim and spider, the guides being rabbetted to provide the horizontal longitudinal extending faces 3 for supporting the rim and the opposed vertical longitudinally extending faces 4 for guiding the rim, the outboard tire retaining flange of the rim resting on the faces 3 and being guided by the faces 4. The transfer mechanism 5 is provided for advancing the assembled rim and spider into vertical registration or axial alignment with the rivet inserting machine, this transfer mechanism comprising the horizontal reciprocable bar 6 movable longitudinally of the frame 1, the arm 7 pivotally mounted on the bar and extending transversely of and above a guide 2 of the frame and the upright pin 8 engageable with the valve stem hole in the outboard tire retaining flange of the rim.

The machine also has the fixed horizontal bottom plate 9 which is mounted on and secured to the upright posts 10 intermediate their ends. The posts are located at the sides of the frame 1 between its ends. The bottom plate supports the frame 1 and the transfer mechanism 5 and is located below the guides 2 of the frame and has secured thereto the depending vertical fluid pressure actuated cylinder 11 which in the present instance is a double acting air cylinder of conventional or standard construction of that type having a predetermined stroke of piston. The cylinder has ports at its lower and upper ends for the passage of compressed air to raise and lower the piston to which is secured the piston rod 12 which extends upwardly through the bottom plate 9 and has secured to its upper end the plate 13 for carrying the assembled rim and spider. The plate 13 has secured thereto at diametrically opposite sides the depending guide rods 14 which slidably pass through bushings in the bottom plate 9. Also the plate 13 has mounted thereon C-shaped abutment 15 for engaging the lower face of the outboard tire retaining flange and supporting the rim and spider assembly. The plate 13 and abutment 15 are formed with flat sides providing clearance to pass between the guides 2. The plate 13 is also formed with the recess 16 and the space between the ends of the C-shaped abutment 15 register with the recess to provide clearance for the transfer arm 7 when in its advanced position so that when the plate is raised to pass from its predetermined lower position below the guides and transfer arm to its upper position the guides and transfer arm do not interfere. The remaining portions of the peripheries of the plate and abutment are arcuate and have the same radius from the axis of the plate. The plate 13 has secured to its upper side the central plate 17 which is provided with the upwardly extending pilot 18 in axial alignment with the plate and engageable with the central annular flange of the bolting-on portion of the spider. The central plate 17 is also provided with the positioning pin 19 for engaging a bolt hole of the bolting-on portion of the spider. As a result the rim and spider assembly is axially and angularly positioned with respect to the rivet inserting machine.

To limit the upward movement of the rim and spider assembly so that it will occupy a predetermined upper position there are the fixed angularly spaced arcuate abutments 20 in the nature of blocks secured to the lower faces of the blocks 21 which in turn are secured to the lower face of the top plate 22. The abutments 20 are engageable with the upper face of the inboard tire retaining flange of the rim and have their lower faces predeterminedly located to accurately locate the upper position of the tire and rim assembly. The top plate 22 is mounted on the posts 23 which extend upward from and are secured to the intermediate plate 24. The latter plate is mounted on and secured to the posts 10 and has a central opening for the passage of the tire and rim assembly.

The machine also comprises the rivet hopper and pickup plunger mechanism 25, the rivet inserting mechanism 26 and the rivet separating devices 27, the rivet inserting mechanisms and rivet separating devices corresponding in number to the rivet holes in the base of the well of the rim and the peripherally flanged portions of the spider.

The rivet hopper and pickup mechanism is mounted on the top plate 22 and comprises the rivet hopper 28, the rivet pickup plunger 29 and the vertical fluid pressure actuated cylinder 30 connected to the pickup plunger. The rivet hopper has the cylindrical side wall 31 and also has a bottom wall formed of the upper and lower plates 32 and 33 respectively. The side wall is secured to the upper surface of the top plate by suitable means such as the bolts 34 and the lower plate extends upwardly within the central stepped opening 35 in the top plate and is secured thereto by suitable means such as the bolts 36. The upper plate is clamped between the side wall and the lower plate and the side wall and the lower plate are angularly positioned with respect to each other by the dowel pin 37. The upper plate fits within the side wall as does also the upper reduced portion of the lower plate. The upper plate is formed with the central opening 38 and the radial openings 39 communicating with the central opening and the lower plate is formed with the central opening 40 and the diametrically opposite pairs of radial projections 41 extending into the opening and having therebetween the diametrically opposite radial openings 42 communicating with the central opening 40. The center lines of the radial openings 42 register vertically with the center lines of the radial openings 39 thereabove.

The pickup plunger 29 extends through the upper and lower plates 32 and 33 and has the central body 43 and the radial arms 44 extending from end to end of the pickup plunger. The body extends through the central openings of the bottom plates and the arms extend through the radial openings of the bottom plates. The radial projections 41 of the lower plate 33 are slidably engageable with diametrically opposite arms of the pickup plunger to guide the same during its reciprocation and the radial portions of the upper plate 32 between its radial openings 39 close the V-shaped spaces between the arms of the pickup plunger and support the rivets in these spaces.

The upper ends of the radial arms 44 and also the portion of the upper end of the central body 43 surrounding the rod 45 connecting the pickup plunger 29 to the piston of the fluid pressure actuated cylinder 30 are inclined downwardly in a radially outward direction from the axis of the pickup plunger and toward the outer ends of the arms and the side wall of the hopper. The correspondingly inclined upwardly opening rivet receiving slots 46 are formed in the upper ends of the arms and the upper end portion of the body and these slots have upper and lower portions which substantially conform in cross sectional shape to the heads and shanks respectively of the single headed rivets. 47 are vertical rivet guide elements within and secured to the hopper side wall and extending vertically upwardly from the upper plate 32 at the radially outer ends of the radial arms 44. The upper ends of the guide elements are also inclined downwardly in a radially outward direction and are formed with the correspondingly inclined upwardly opening rivet receiving slots 48 angularly positioned to register with and lead downwardly from the rivet receiving slots 46. The hopper side wall 31 is provided with the angularly spaced apertures 49, the side edge portions of which extend below the intermediate portions and are of a width sufficient to receive the outwardly extending parts 50 of the guide elements. A pair of guide elements extends through each aperture. The rivet receiving slots 48 of the guide elements are formed by the furcations 51 and the upper surfaces of the furcations of each pair of guide elements are inclined downwardly in a laterally inward direction toward the intermediate portion of the aperture 49 through which the guide elements pass so that any surplus rivets which are those not located in the slots 48 but located above the guide elements may roll or slide off the upper surfaces of the furcations forming the slots. For conducting the rivets from the guide elements to the rivet inserting mechanisms 26 there are the chutes 52 having rivet receiving slots of substantially the same shape as the slots 46, the upper ends of the chutes being secured to the guide elements outside the rivet hopper with the slots of the chutes in continuation of and leading downwardly from the slots of the guide elements.

For the purpose of returning the surplus rivets which are those not located in the guiding slots and which pass through the apertures 49 of the hopper side wall, the pocket members 53, preferably formed of sheet metal, are provided. These pocket members are at the outer side of the side wall and extend over the apertures and the guide elements and have their bottoms inclined and extending over the lower edges of the intermediate portions of the apertures 49 and terminating substantially at the inner surface of the side wall 31.

The fluid pressure actuated cylinder 30 in the present instance is a double acting air cylinder of conventional or standard construction of that type having a predetermined stroke of piston. As before stated, the piston is connected to the pickup plunger by the rod 45. The cylinder is mounted on and secured to the cross bars 54 which rest at their ends upon the upper end of the hopper side walls 31 and are secured thereto.

In operation, when compressed air is admitted to the lower end of the air cylinder 30, the pickup plunger 29 is raised from its lower position to its upper position. In its lower position the plunger slots 46 extend below the guide element slots 48 and are located so that their radially outer ends are slightly above the upper plate 32. In its upper position the plunger slots are in continuation of the guide element slots so that the rivets which have been picked up in the plunger slots may slide downwardly into the slots of the guide elements and then into the slots of the chutes. Any surplus rivets which are raised by the pickup plunger and are not located in the slots, may be returned to the hopper by falling off the upper inclined surfaces of the furcations forming the guide element slots either into the spaces between the guide elements or into the pocket members which latter return the rivets through the apertures 49.

The rivet inserting mechanisms 26 and the rivet separating devices 27 are arranged in groups of three with each mechanism of each group comprising the push rod 55, the slide 56, the fluid pressure actuated cylinder 57 for actuating the push rod and slide and the guide 58 common to the three slides. Each slide is longitudinally reciprocable toward and away from and radially of the work or rim and spider assembly and is located radially outwardly of the assembly. The guide comprises the block 59 and the cover 60, the block being mounted on and secured to the plate 24 and having a guideway for each of the three slides extending radially of the machine. The cover is mounted on and secured to the block and has mounted on and secured to its inner end portion the block 61 to which the lower end portions of the three associated rivet chutes 52 are secured. Each slide has reciprocably mounted thereon a push rod 55 in axial alignment with a rivet hole in the rim and spider assembly and axially movable radially of the machine. As shown the slide has the longitudinal hole 62 threadedly engaged at its outer end by the bushing 63 in which the push rod is slidable. The push rod is provided intermediate its ends with the fixed collar 64 abutted at its outer side by the collar 65 sleeved on the push rod. The bushing 63 and the collar 65 form abutments for the coil spring 66 encircling the push rod. The bushing 63 also forms an abutment for the coil spring 67 encircling the push rod and located at the outer end of the bushing. The inner end of the slide 56 has the furcations 68 between which extends the holding member 69 having the arm 70 provided in its upper face with the upwardly opening groove 71 for receiving a rivet. The holding member is pivoted to the furcations by the transverse pin 72 and has the depending arm 73 which is abutted by the coil spring 74 extending within a bore in the slide 56. The coil spring 74 acting on the arm 73 normally holds the arm 70 in a position determined by the transverse pin 75 in the latter arm engaging lower surfaces of the furcations 68. The furcations 68 extend inwardly beyond the inner end of the arm 70 so that upon inward movement of the slide the furcations 68 engage the base of the well of the rim while the arm is still spaced outwardly of the well base. 76 is a cooperating holding member above the holding member 69 and formed of resilient material such as spring steel. This resilient holding member has the spaced arms 77 which are secured at their outer ends to the slide 56, the base 78 and the tongue 79 extending outwardly of the machine from the base. The portion of the base above the groove of the holding member 69 and also the tongue are convex and form a downwardly opening groove for cooperating with the groove in the holding member 69 when in its operative position to accurately position the rivet so that it will be in axial alignment with the rivet hole into which it is to be advanced. For limiting the outward movement of the slide 56 there is the stop 80 in the nature of a plate secured to the outer end of the guide block 59 and engageable with the outer end of the slide in the retracted position of the slide.

The fluid pressure actuated cylinder 57 is a double acting air cylinder of conventional or standard construction of that type having a predetermined stroke of piston. The cylinder has parts at its outer and inner ends for the passage of compressed air to reciprocate the piston to which the rod 81 is secured. The cylinder is in axial alignment with the push rod operated thereby and is mounted on the bracket 82 which in turn is mounted on the plate 24 radially outwardly of the machine from the guide 58.

Each rivet separating device 27 comprises the separating rod 83 which is directly above and parallel to the associated push rod 55, the cylindrical housing 84 in which the push rod is axially reciprocable and the plate 85 for operating the separating rod from the cylinder 57. The separating rod has the inner and outer cylindrical parts 86 and 87 with the part 86 of greater diameter than the part 87 and slidable in the inner and outer sleeve bearings 88 and 89 within the housing 84 and abutting the annular shoulders 90 and 91 respectively. The inner sleeve bearing 88 extends inwardly beyond the inner end of the housing 84 transversely of and into the chute 52 so that the chute carries the housing of the rivet separating device through the inner sleeve bearing. The inward extension of the inner sleeve bearing is formed with the vertically aligned rivet inlet and outlet openings 92 and 93 respectively with the inlet opening in continuation of and registering with the rivet groove of the chute 52. The larger diameter part 86 of the separating rod has at its inner end the hollow portion 94 which is formed in its upper and lower parts respectively with the rivet inlet and outlet openings 95 and 96. The rivet inlet opening 95 extends to the inner end of the hollow portion and has a width slightly greater than the diameter of the rivet head so that a rivet may freely pass through the inlet opening when it is positioned below the inlet opening 92 of the sleeve bearing 88. The rivet outlet opening 96 is spaced outwardly of the separating rod from the inlet opening 95 and has the parts 97 and 98 of a size to provide for the free passage therethrough of a rivet. 99 is a plate secured to the upright block 100 upon the housing 84 and having the projection 101 extending through the inlet openings 92 and 95. 102 is a second plate secured to the chute 52 and having the projection 103 extending through the inlet opening 95. The opposed surfaces of the plates and projections are flush with the opposed faces of the chute forming the ends of the rivet receiving groove. The projections serve as stops to limit or prevent longitudinal movement of the rivet in the hollow portion 94. Also, the plate 102 abuts the inward extension of the sleeve bearing 88 and positions the housing 84. Furthermore, the plate 101 forms an abutment for engaging the shoulder 104 of the separating rod 86 and limiting its inward movement positioning the outlet opening 96 between the projections 101 and 103 so that a rivet within the hollow portion 94 may drop through the outlet openings 96 and 93 and the lower end portion of the chute 52 to a position within the chute and at its lower end which is above the arm 70 of the holding member 69 and outwardly of the tongue 79 of the holding member 76 when the slide is in its retracted or outer position.

For the purpose of separating the rivet within the hollow portion 94 of the separating rod 83 from the immediately above rivet and holding these two rivets separated, the hollow portion 94 is formed in its upper part with the outwardly tapering intermediate opening 105 and the outer opening 106. The opening 106 has a width slightly less than the diameter of the rivet shank while the opening 105 communicates with the inlet opening 95 and the opening 106 and has a width which progressively decreases from the first to the second openings. Also the edges of the intermediate opening have their upper surfaces inclined upwardly from the edges of the opening 95 to the edges of the opening 106. As a result, during the inward movement of the separating rod 83 from its outer or retracted position the edges of the intermediate opening 105 pass between the head of the rivet within the hollow portion 94 and the head of the rivet immediately above and raise the latter rivet and the rivets above the latter rivet and then the edges of the opening 106 engage the head and shank of the immediately above rivet and hold the same raised.

The push rod 55 in the present instance is threaded into the rod 81 connected to the piston of the cylinder 57 and the plate 85 is sleeved over the push rod 55 and clamped against the inner end of the rod 81 by suitable means such as the nut 107. The upper end of this plate has the vertically extending slot 108 through which the smaller diameter portion 87 of the separator rod extends. The latter is operatively connected to the plate 85 by means of the coil spring 109 and the washer 110 encircling the smaller diameter portion and located at the inner side of the plate and the nut 111 threaded on the smaller diameter portion and located at the outer side of the plate.

In operation and assuming the piston of the cylinder 57 to be in its outer or retracted position and also the slide 56, the push rod 55 and the separating rod 83 to be in their outer or retracted positions and a rivet to be supported on the arm 70 of the holding member 69, when compressed air is admitted to the outer end of the cylinder 57 the piston of this cylinder is advanced inwardly and during its advance moves the push rod 55 inwardly so that its inner end engages the head of the rivet on the holding member 69 and advances the rivet into position between the holding members 69 and 76. Then the nut 107 engages the coil spring 67 and through this spring advances the slide 56 at the same rate as the push rod is being advanced until the inner end of the slide engages the base of the well of the rim at which time the slide remains stationary and the shank of the rivet has partially entered the rivet hole. As advance of the push rod continues it ejects the rivet from the holding members into the rivet hole. During the ejection of the rivet, the inner end of the arm 70 of the holding member 69 swings downwardly compressing the coil spring 74 through the arm 73 and at the same time the base and tongue at the inner end of the resilient holding member 76 springs upwardly. Upon the return stroke of the piston of the cylinder 57 the push rod 55 is positively returned and during its return the coil spring 66 is compressed so that it, through the abutment formed by the bushing 63 returns the slide 56 to its retracted position as determined by the stop 80. In the outer or retracted position of the push rod 55 its inner end is outwardly of the lower end of the chute 52.

In the retracted position of the separating rod 83, it will be noted that the rivet inlet opening 95 is in registration with the inlet opening 92 and the chute 52 so that a rivet is located within the hollow portion 94. When the piston of the cylinder 57 is advanced from its retracted position the washer 110 is advanced by the plate 85 and exerts an inwardly directed force upon the coil spring 109 which resiliently acts upon the shoulder of the separating rod between its larger and smaller portions to axially advance the separating rod inwardly during which time the wedge shaped edges of the intermediate opening 105 pass between the head of the rivet within the hollow portion and the head of the rivet immediately above and then the edges of the opening 106 engage the head of the immediately above rivet and the rivet outlet opening 96 is placed in registration with the outlet opening 93 so that the rivet within the hollow portion is free to pass downwardly through the outlet opening. The timing is such that the push rod is advanced inwardly so that its inner end is inwardly beyond the lower end of the chute before the rivet outlet opening of the separating rod is in position to allow a rivet to drop from the hollow portion of the separating rod and as a result the rivet drops upon the push rod. During the remainder of the inward advance of the push rod, the separating rod remains stationary by reason of the shoulder 104 of the separating rod contacting the plate 101. During the retraction of the push rod, the plate 85 engages the nut 111 and retracts the separating rod.

For preventing shock which might be incurred by the return of the separating rod there is the flat spring 112 sleeved upon the separating rod and located between the nut 111 and the nut 113 which is threaded on the smaller diameter portion of the separating rod. This flat spring extends downwardly a sufficient distance to engage the bracket 82.

All of the air cylinders 57 are operated in unison and the flow of compressed air to these air cylinders is controlled in a usual manner by means of a valve and solenoid unit which is of conventional or standard construction, the solenoid of the unit in turn being controlled by a limit switch which is also of conventional or standard construction. For the purpose of controlling the operation by the work, or the rim and spider assembly, there is additionally provided the electric switch 114 which is normally open and the resilient finger 115 for closing the switch upon being engaged by the rim during the raising of the rim and spider assembly. The electric switch is in the same electrical circuit as the limit switch and solenoid. When the rim and spider assembly is being raised, the rim contacts the finger 115 which closes the switch 114 so that when the limit switch is closed in the upper position of the rim and spider assembly and the solenoid of the valve and solenoid unit is energized, compressed air flows to the outer ends of the cylinders for actuating the rivet separating devices and rivet inserting mechanisms. However, if no rim and spider assembly is present during the raising operation the finger is not operated so that no compressed air can be admitted to the cylinders.

The air cylinders 11, 30 and 57 operate in timed relation and while the operation may be manually controlled it may also be and preferably is automatically controlled in much the same manner as shown in my copending application Ser. No. 121,866 filed October 17, 1949, for controlling the operation of the cylinders 29 and 53.

What I claim as my invention is:

1. In a machine for inserting a rivet into a hole, a slide reciprocable toward and away from the work having the hole, a device for yieldably holding a rivet in axial alignment with the hole, an axially reciprocable push rod on said slide in axial alignment with the hole, means for positively reciprocating said push rod, slide advancing and retracting springs sleeved on said push rod, an abutment on said slide between and engageable by said springs, and shoulder members on said push rod engageable with said springs, one of said shoulder members in the retracted positions of said slide and push rod being spaced from said slide advancing spring and being engageable therewith during the advancing of said push rod and after said push rod has advanced a rivet into said rivet holding device, the other of said shoulder members acting on said slide retracting spring during the return of said push rod whereby said slide retracting spring retracts said slide.

2. In a machine for inserting a rivet into a hole, a slide reciprocable toward and away from the work having the hole, an axially reciprocable push rod on said slide in axial alignment with the hole and reciprocable through a greater distance than said slide, a rivet separating device comprising an axially reciprocable separating rod above said push rod for feeding individual rivets to said push rod, means for positively reciprocating said push rod, cooperating means between said push rod and slide and separating rod for reciprocating said slide and separating rod by said push rod, said cooperating means including springs for advancing and returning said slide and a spring for advancing said separating rod, and means yieldably limiting the return movement of said separating rod.

3. In a rivet inserting machine, a rivet separating device for feeding individual rivets comprising a housing having vertically aligned inlet and outlet openings, an axially reciprocable separating rod extending horizontally within said housing and having a hollow portion for freely receiving a rivet, said hollow portion being formed in its upper and lower parts respectively with rivet inlet and outlet openings spaced longitudinally of said hollow portion relative to each other, stationary means extending within said hollow portion for limiting longitudinal movement of a rivet within said hollow portion, and means for axially reciprocating said separating rod to alternately register the inlet openings with each other and the outlet openings with each other.

4. In a rivet inserting machine, a chute for a series of gravity fed rivets, a rivet separating device for feeding individual rivets comprising a housing having vertically aligned inlet and outlet openings, an axially reciprocable separating rod extending horizontally within said housing and having a hollow portion for freely receiving a rivet, said hollow portion being formed in its upper and lower parts respectively with rivet inlet and outlet openings spaced longitudinally of said hollow portion relative to each other, stationary means on said chute extending within said hollow portion for limiting longitudinal movement of a rivet within said hollow portion, and means for axially reciprocating said separating rod to alternately register the inlet openings with each other and the outlet openings with each other.

5. In a rivet inserting machine, a reciprocable slide, a rivet holding device on said slide, an axially reciprocable push rod in substantially axial alignment with said holding device, an axially reciprocable separating rod above and parallel to said push rod, means for advancing said push rod to move a rivet into said holding device, yieldable means between said push rod and slide to then advance said slide with said push rod, said push rod on continued advancement subsequently forcing the rivet from said holding device, a member upon and movable with said push rod and yieldable means upon said separating rod and engageable by said member during advancement of said push rod for advancing said separating rod.

6. In a rivet inserting machine, a reciprocable member for advancing individual rivets, a second reciprocable member above and substantially parallel to first mentioned member having a hollow portion of a size to freely receive a rivet, said hollow portion being formed with rivet inlet and outlet openings respectively in its upper and lower parts spaced longitudinally of said hollow portion relative to each other, means extending within said hollow portion for limiting longitudinally movement of a rivet in said hollow portion, a transverse member upon said first mentioned reciprocable member and spring means upon second reciprocable member engageable by said transverse member upon advancement of said first mentioned reciprocable member to advance said second reciprocable member.

7. In a rivet inserting machine, a rivet separating device for feeding individual rivets comprising an axially reciprocable separating rod having a hollow portion for freely receiving a rivet, said hollow portion being formed in its upper part with an opening of a size to provide for free passage therethrough of a rivet, an aligned opening spaced from said first mentioned opening and of a width slightly less than the diameter of the rivet shank and an intermediate aligned opening of a width progressively decreasing from said first mentioned opening to said second mentioned opening, said hollow portion also being formed in its lower part with an outlet opening spaced longitudinally of said hollow portion from said first mentioned opening.

8. In a rivet inserting machine, a rivet separating device for feeding individual rivets comprising an axially reciprocable separating rod having a hollow portion for freely receiving a rivet, said hollow portion being formed in its upper part with an opening of a size to provide for free passage therethrough of a rivet, an aligned opening spaced from said first mentioned opening and of a width slightly less than the diameter of the rivet shank and an intermediate aligned opening of a width progressively decreasing from said first mentioned opening to said second mentioned opening, said hollow portion also being formed in its lower part with an outlet opening spaced longitudinally of said hollow portion from said first mentioned opening, a stationary member extending into said hollow portion and engageable with said rod for limiting movement of said rod in one direction, and a second stationary member extending into said hollow portion in spaced relation to said first mentioned stationary member and cooperating with said first mentioned stationary member to limit longitudinal movement in either direction of a rivet in said hollow portion.

9. In a rivet inserting machine, a reciprocable slide, a rivet holding device on said slide, an axially reciprocable push rod in substantially axial alignment with said holding device, an axially reciprocable separating rod above and parallel to said push rod, means for advancing said push rod to move a rivet into said holding device, yieldable means between said push rod and slide to then advance said slide with said push rod, said push rod on continued advancement subsequently forcing the rivet from said holding device, a member upon and movable with said push rod, yieldable means upon said separating rod and engageable by said member during advancement of said push rod for advancing said separating rod and means yieldably limiting the return movement of said separating rod.

10. In a machine for inserting a rivet into a hole in an assembled rim and wheel body, mechanism for axially moving the assembled rim and wheel body to a predetermined position, mechanism for inserting a rivet into the hole when the assembled rim and wheel body occupy said predetermined position comprising a rivet advancing member located adjacent said predetermined position and movable toward and away from the assembled rim and wheel body, means for moving said rivet advancing member, control means including an electric switch for controlling the operation of said moving means, said control means being operative to actuate said moving means when said switch is operated, and a member for operating said switch, said member being located in the path of and operated by the assembled rim and wheel body during said movement to predetermined position.

11. In a machine for inserting a rivet into a hole, a slide reciprocable toward and away from the work having the hole, an axially reciprocable push rod on said slide in axial alignment with the hole and reciprocable through a greater distance than said slide, a rivet separating device comprising an axially reciprocable separating rod above said push rod for feeding individual rivets to said push rod, means for positively reciprocating said push rod, and cooperating means between said push rod and slide and separating rod for reciprocating said slide and separating rod by said push rod, said cooperating means including springs for advancing and returning said slide and a spring for advancing said separating rod.

12. In a machine for inserting a rivet into a hole, a slide reciprocable toward and away from the work having the hole, an axially reciprocable push rod on said slide in axial alignment with the hole and reciprocable through a greater distance than said slide, a reciprocable rivet separating device above said push rod for feeding individual rivets to said push rod, means for positively reciprocating said push rod, and cooperating means between said push rod and slide and separating device for reciprocating said slide and separating device by said push rod, said cooperating means including spring means for yieldably advancing said slide with said push rod.

13. In a rivet inserting machine, a reciprocable slide, a rivet holding device on said slide, an axially reciprocable push rod in substantially axial alignment with said holding device, a reciprocable rivet separating device above said push rod, means for advancing said push rod to move a rivet into said holding device, yieldable means between said push rod and slide to then advance said slide with said push rod, said push rod on continued advancement subsequently forcing the rivet from said holding device, and cooperable means between said push rod and separating device for reciprocating said separating device by said push rod.

References Cited in the file of this patent

UNITED STATES PATENTS

| | | |
|---|---|---|
| 913,151 | Neher | Feb. 23, 1909 |
| 937,150 | Havener | Oct. 19, 1909 |
| 1,191,180 | Havener | July 18, 1916 |
| 1,358,900 | Van Haagen | Nov. 16, 1920 |
| 1,477,211 | Dlesk | Dec. 11, 1923 |
| 1,660,417 | Crehan et al. | Feb. 28, 1928 |
| 1,923,377 | Hughes | Aug. 22, 1933 |
| 2,303,005 | Swangren | Nov. 24, 1942 |
| 2,360,991 | Ward et al. | Oct. 24, 1944 |
| 2,397,872 | Kovacs | Apr. 2, 1946 |
| 2,521,209 | Fether | Sept. 5, 1950 |